(12) United States Patent
Feng (10) Patent No.: US 11,315,447 B2
(45) Date of Patent: Apr. 26, 2022

(54) DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Zikang Feng, Hubei (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 16/978,701

(22) PCT Filed: Jun. 24, 2020

(86) PCT No.: PCT/CN2020/098084
§ 371 (c)(1),
(2) Date: Sep. 6, 2020

(87) PCT Pub. No.: WO2021/237851
PCT Pub. Date: Dec. 2, 2021

(65) Prior Publication Data
US 2021/0375165 A1 Dec. 2, 2021

(30) Foreign Application Priority Data
May 26, 2020 (CN) .......................... 202010456156.6

(51) Int. Cl.
*G06F 1/16* (2006.01)
*G09F 9/30* (2006.01)

(52) U.S. Cl.
CPC ............ *G09F 9/301* (2013.01); *G06F 1/1652* (2013.01)

(58) Field of Classification Search
CPC .............................. G06F 1/1652; G09F 9/301
See application file for complete search history.

(56) References Cited

U.S. PATENT DOCUMENTS

| 10,499,515 | B2 * | 12/2019 | Lee | ................ H05K 1/028 |
| 10,747,269 | B1 * | 8/2020 | Choi | ................ G06F 1/1656 |
| 10,955,876 | B1 * | 3/2021 | Song | ................ H04M 1/0268 |
| 10,963,014 | B1 * | 3/2021 | Park | ................ H04B 1/3827 |
| 11,016,532 | B2 * | 5/2021 | Yang | ................ G06F 1/1616 |
| 11,051,413 | B2 * | 6/2021 | Yang | ................ H05K 5/0017 |
| 11,058,018 | B1 * | 7/2021 | Yoon | ................ G06F 1/1652 |
| 11,204,629 | B1 * | 12/2021 | Kwak | ................ G06F 1/1652 |

(Continued)

*Primary Examiner* — Hung S. Bui
*Assistant Examiner* — Sagar Shrestha
(74) *Attorney, Agent, or Firm* — The Roy Gross Law Firm, LLC; Roy Gross (57) ABSTRACT

The present application provides a display device which includes a housing unit, a first supporting structure, a second supporting structure, and a display device. The second supporting structure is slidably arranged opposite to the first supporting unit. A driving mechanism is connected to the second supporting structure. A flexible display screen is laid between a side of the first supporting structure and a side of the second supporting structure, a first end of the flexible display screen is connected to an end of the second supporting structure, and a second end of the flexible display screen is connected to the driving mechanism.

14 Claims, 3 Drawing Sheets

(56) References Cited

U.S. PATENT DOCUMENTS

| | | | |
|---|---|---|---|
| 2006/0068859 A1* | 3/2006 | Lee | H04M 1/0237 |
| | | | 455/575.4 |
| 2013/0058063 A1* | 3/2013 | O'Brien | G06F 1/1652 |
| | | | 361/807 |
| 2014/0194165 A1* | 7/2014 | Hwang | G06F 1/1652 |
| | | | 455/566 |
| 2018/0014417 A1* | 1/2018 | Seo | H05K 1/0203 |
| 2018/0102072 A1* | 4/2018 | Lee | G09G 3/20 |
| 2019/0196560 A1* | 6/2019 | Cha | H04M 1/0279 |
| 2020/0160760 A1* | 5/2020 | Park | G06F 1/1688 |
| 2020/0264660 A1* | 8/2020 | Song | H04M 1/0237 |
| 2020/0348727 A1* | 11/2020 | Lee | G06F 1/1626 |
| 2020/0363841 A1* | 11/2020 | Kim | G06F 1/1624 |
| 2021/0022259 A1* | 1/2021 | Song | H05K 5/0217 |
| 2021/0067731 A1* | 3/2021 | Park | H04N 21/431 |
| 2021/0120111 A1* | 4/2021 | Choi | G06F 1/1624 |
| 2021/0209973 A1* | 7/2021 | Pyo | G06F 1/181 |

\* cited by examiner

DISPLAY DEVICE

FIELD OF INVENTION

The present invention relates to the technical field of display, particularly a display device.

BACKGROUND OF INVENTION

With development of technology, appearances of mobile electronic devices have changed dramatically. Compared with traditional screens, flexible screens have characteristics of strong flexibility and bendability, which can reduce accidental damage to equipment. Moreover, durability of the flexible screens is much higher than other screens.

Existing flexible screens include foldable and rollable display screens, both of which, while reducing a panel size, still occupy a large area.

Therefore, there is an urgent need for a flexible display device to solve the above technical problems.

Technical Problem

The present application provides a display device to solve the technical problem that the existing flexible screen occupies a large area.

Technical Solution

The present application provides a display device which includes:

A housing unit, a first supporting structure is fixed to the housing unit, a second supporting structure is slidably arranged opposite to the first supporting unit, a driving mechanism is disposed in the housing unit and connected to the second supporting structure.

A flexible display screen, laid between a side of the first supporting structure and a side of the second supporting structure, and a first end of the flexible display screen connected to an end of the second supporting structure, the end of the second supporting structure is away from the first supporting structure, a second end of the flexible display screen connected to the driving mechanism.

When the first supporting structure and the second supporting structure slide relatively, the first end and the second end of the flexible display screen move under an action of the driving mechanism to maintain a same distance.

In the display device of the present application, the housing unit includes a first housing and a second housing which are oppositely arranged, the first housing is fixed to the first supporting structure, the second housing is fixed to the second supporting structure.

The flexible display screen includes a first part on a surface of the housing unit and a second part in the housing unit.

The driving mechanism includes a driving structure disposed on the second housing and a driven structure disposed on the first housing, the driving structure is fixed to the driven structure through a first roller.

When the display device displays with a small screen, the first part of the flexible display screen is in a display state, and the second part of the flexible display screen is in a non-display state; when the display device displays with a large screen, the driving structure on the second housing drives the driven structure to rotate, so that the second housing moves in a direction away from the first housing, and the second part of the flexible display screen moves from the housing unit to the surface of the housing unit, the first part and the second part of the flexible display screen are in the display state.

In the display device of the present application, the driving structure includes:

At least one first rack is arranged close to a first side surface or/and a second side surface of the second housing.

At least one first gear is fixed to the first roller, and meshed with the first rack.

When the display device displays with a large screen, the first rack drives the driven structure to rotate in a first direction through the first gear, so that the second housing moves in the direction away from the first housing.

In the display device of the present application, the driving structure further includes:

At least two first bearing sets which include two first bearings, the first bearings are arranged at two sides of the first gear, the first bearings are fixed to the first roller.

At least two first bearing housings correspond to the first bearing sets, the first bearing housings wrap the first bearing sets and the first gear.

In the display device of the present application, the driven structure includes:

At least two driven wheel sets, each of the driven wheel sets includes a first driven wheel and a second driven wheel, the first driven wheel is fixed to the first roller, the first driven wheel is arranged between the first gear and the first bearing which is away from a side of the first bearing housings.

A connecting wheel which is configured to connect the first driven wheel and the second driven wheel, and enables the first driven wheel and the second driven wheel to rotate synchronously.

When the display device displays with a large screen, the first rack enables the first driven wheel to rotate in a first direction through the first gear and the first roller, the first driven wheel drives the second driven wheel to rotate along a first direction through the connecting wheel, so that the second housing moves away from the first housing.

In the display device of the present application, a pitch circle diameter of the first gear is equal to a diameter of the first driven wheel.

In the display device of the present application, the first driven wheel and the second driven wheel are belt pulleys, and the connecting wheel is a belt; or the first driven wheel and the second driven wheel are chain wheels, and the connecting wheel is a chain.

In the display device of the present application, the display device further includes:

A sliding block which is fixed on the connecting wheel.

A second roller, disposed on one side of the first housing away from the driving structure, the second driven wheel is fixed on the second roller, the second part of the flexible display screen extends into the first housing along the second roller and fixed to the sliding block.

When the display device displays with a large screen, the second housing moves in the direction away from the first housing by an external driving force, the connecting wheel drives the sliding block to move towards the direction away from the first gear, the flexible display screen rolls along a first direction of the second roller, so that the second part of the flexible display screen moves from an inner part of the first housing to a surface of the first housing.

When the display device displays with a small screen, the second housing moves in a direction approaching the first housing by the external driving force, the connecting wheel drives the sliding block to move towards the direction approaching the first gear, the flexible display screen rolls along a second direction of the second roller, so that the second part of the flexible display screen moves from the surface of the first housing to the inner part of the first housing and extends toward the direction of the first gear.

In the display device of the present application, the display device further includes two bearings arranged at two sides of the second roller, the external driving force makes the second roller rotate in the second bearing.

In the display device of the present application, the flexible display screen includes a display panel, a stretching layer, and a bonding layer positioned between the display panel and the stretching layer.

A first end of the stretching layer is fixed to the second housing, and a second end of the stretching layer is fixed to the sliding block.

In the display device of the present application, an area of the display panel is smaller than an area of the stretching layer.

In the display device of the present application, the flexible display screen further includes a third part fixed on the sliding block, the third part of the flexible display screen corresponds to the stretching layer, and the third part of the flexible display screen is a non-functional area of the display device.

In the display device of the present application, a material of the stretching layer is a stretchy Steel Special Use Stainless (SUS) metal material or an amorphous material.

In the display device of the present application, the bonding layer is an adhesive layer such as an optically clear adhesive.

In the display device of the present application, the first housing includes a rear housing, a first side housing and a second side housing, wherein the first side housing and the second side housing are positioned on two sides of the rear housing, the first side housing corresponds to a first side of the second housing, and the second side housing corresponds to a second side of the second housing.

Wherein the first side housing and the second side housing include a first rail close to the flexible display screen and a second rail away from the flexible display screen, the first rack and the second rack move on the first rail, and the sliding block moves on the second rail.

In the display device of the present application, the first supporting structure includes a first supporting plate fixed to the rear housing of the first housing, and the second supporting structure comprises a box body fixed to a front housing of the second housing.

When the display device displays with a small screen, the first supporting plate is contained in the box body.

When the display device displays with a large screen, the first supporting plate moves from the box body to a direction away from the front housing.

In the display device of the present application, the first supporting structure and the second supporting structure are a matched comb-shaped supporting rods.

In the display device of the present application, the housing unit is further provided with a processor, a driving chip and a power supply assembly.

Beneficial Effect

The present application disposes the driving mechanism on the display device to make the first supporting structure and the second supporting structure slide relatively and maintain a same distance so that the display device will not receive excessive pulling force, damage to the flexible display screen can be prevented, and the lifespan of the display device will be longer. Furthermore, the flexible display screen of the display device can display with small screen or large screen without enlarging volume.

DETAILED DESCRIPTION OF PREFERRED EMBODIMENTS

The objects, technical solutions, and beneficial effect of the present application will be further described in detail below with reference to the accompanying drawings and embodiments. It shall be noted that the described embodiments are used to describe and understand the present disclosure, but the present disclosure is not limited thereto.

Compared with traditional screens, existing display panels have characteristics of strong flexibility and bendability, which can reduce a degree of accidental damage to devices. Moreover, their durability is much higher than other screens. However, the existing display panels still occupy a large area although a panel size has already been reduced by an extent. Based on the technical problem, the present application provides technical solutions as follows.

Please refer to FIGS. 1-7, the present application provides a display device 100 which includes the following elements.

A housing unit 10, a first supporting structure is fixed to the housing unit 10, a second supporting structure is slidably arranged opposite to the first supporting unit, and a driving mechanism is disposed in the housing unit and connected to the second supporting structure.

A flexible display screen 20 is laid between a side of the first supporting structure and a side of the second supporting structure, a first end of the flexible display screen 20 connected to an end of the second supporting structure, the end of the second supporting structure is away from the first supporting structure, and a second end of the flexible display screen 20 is connected to the driving mechanism.

When the first supporting structure and the second supporting structure slide relatively, the first end and the second end of the flexible display screen 20 move under an action of the driving mechanism to maintain a same distance.

The present application disposes the driving mechanism on the display device to make the first supporting structure and the second supporting structure slide relatively and maintain a same distance so that the display device 100 can display with small screen or large screen without enlarging volume.

The technical solution of the present application will now be described with reference to specific embodiments.

Please refer to FIGS. 1-7, the housing unit 10 includes a first housing 11 and a second housing 12 which are oppositely arranged, the first housing 11 is fixed to the first supporting structure, and the second housing 12 is fixed to the second supporting structure. The flexible display screen 20 includes a first part 21 on a surface of the housing unit and a second part 22 in the housing unit 10. The driving mechanism may include a driving structure disposed on the second housing 12 and a driven structure disposed on the first housing 11, and the driving structure is fixed to the driven structure through a first roller 40.

When the display device 100 displays with a small screen, the first part 21 of the flexible display screen 20 is in a display state, and the second part 22 of the flexible display screen 20 is in a non-display state; when the display device 100 displays with a large screen, the driving structure on the second housing 12 drives the driven structure to rotate, so that the second housing 12 moves in a direction away from the first housing 11, the second part 22 of the flexible display screen 20 moves from the housing unit 10 to the surface of the housing unit 10, and the first part 21 and the second part 22 of the flexible display screen 20 are in the display state.

The present application disposes the driving structure and the driven structure on the display device 100 to make the second housing 12 move in a direction away from or towards the first housing 11, so that the display device 100 can display with small screen or large screen without enlarging volume.

Figure 1:
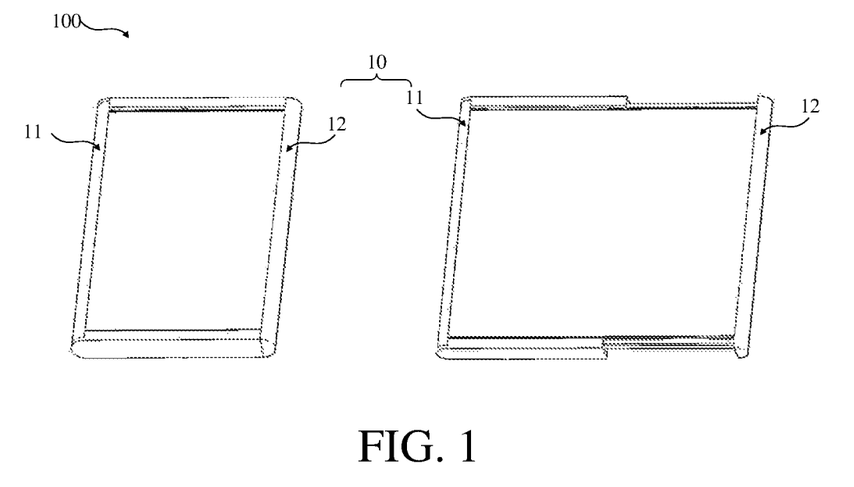
FIG. 1 is a schematic view of a display device according to the present application.

Please refer to FIG. 1, the left figure is a schematic view of the folded display device 100, and the right figure is a schematic view of the stretched display device 100. A user gives a driving force to the second housing 12 in a third direction to make the second housing 12 move away from the first housing 11, so that the display device will be in stretched state. Similarly, the user may also give the driving force to the second housing opposite to the third direction to make the second housing 12 move towards the first housing 11 so that the display device 100 is in a folded state.

In this embodiment, the third direction is a pulling direction of the second housing 12.

Figure 2:
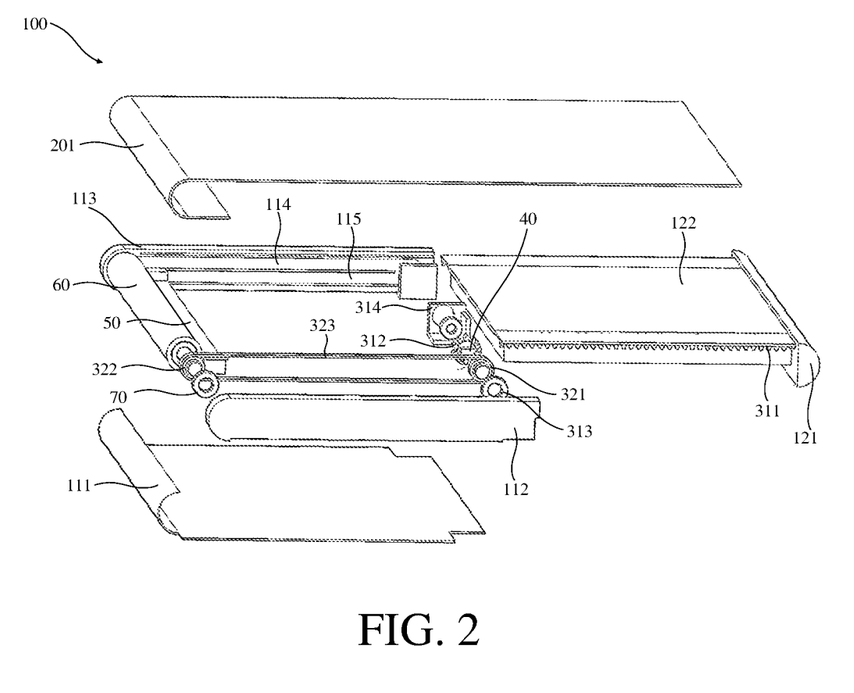
FIG. 2 is an exploded view of the display device according to the present application.

Please refer to FIG. 2, the first housing 11 includes a rear housing 111, a first side housing 112, and a second side housing 113, wherein the first side housing 112 and the second side housing 113 are positioned on two sides of the rear housing 111, the first side housing 112 corresponds to a first side of the first housing 11, and the second side housing 113 corresponds to a second side of the first housing 11. The second housing 12 includes a front housing 121.

In this embodiment, the first supporting structure includes a first supporting plate (not shown) fixed to the rear housing of the first housing, and the second supporting structure includes a box body 122 fixed to the front housing 121 of the second housing. The box body 122 is arranged between the first side housing 112 and the second side housing 113. The first supporting plate and the box body 122 are configured to support the flexible display screen 20.

When the display device 100 displays with a small screen, the first supporting plate is contained in the box body 122. When the display device 100 displays with a large screen, the first supporting plate moves from the box body 122 to a direction away from the front housing 121.

Figure 3:
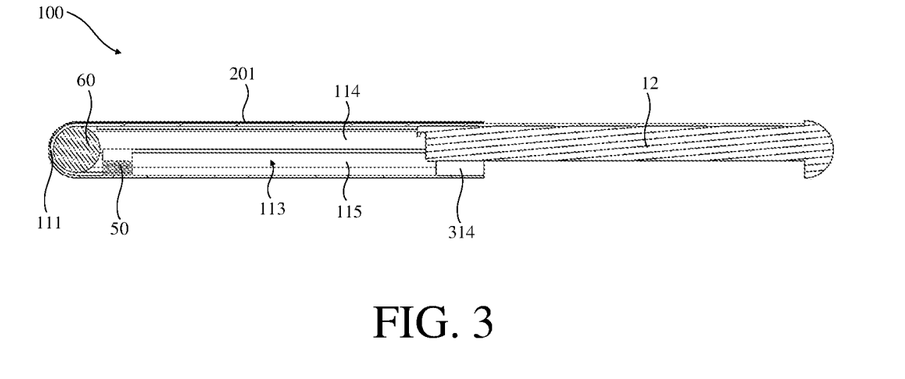
FIG. 3 is a schematic view of the display device in a stretched state according to the present application.
Figure 5:
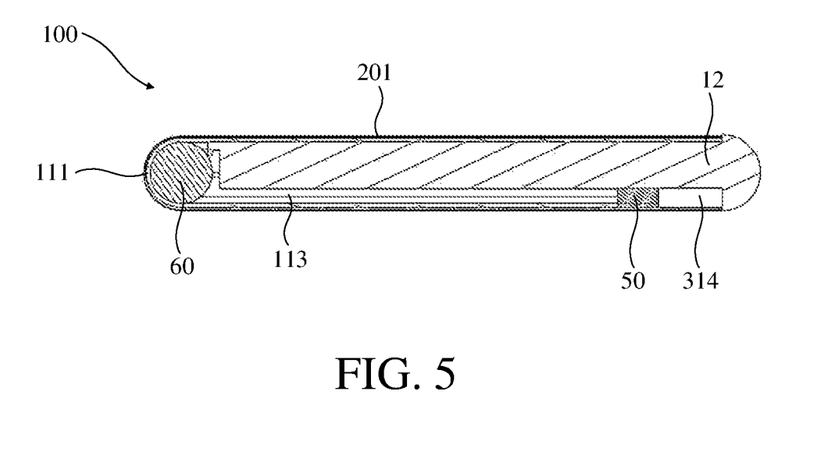
FIG. 5 is a schematic view of the display device in a folded state according to the present application.

In this embodiment, as shown in FIG. 5, when the display device 100 displays with a small screen, the box body 122 is configured to support a first part 21 of the flexible display screen 20. As shown in FIG. 3, when the display device 100 displays with a large screen, the first part 21 of the display device 100 displays with a large screen, and the first part 21 follows the box body 122 to move in the direction away from the first housing 11. The box body 122 provides a supporting structure to support the first part 21.

Based on the above embodiments, when the display device 100 displays with the small screen, the first supporting plate is contained in the box body 122, and when the display device 100 displays with the large screen, the supporting plate contacts a second part 22 of the flexible display screen 20 via a mechanical structure and supports the second part 22 of the flexible display screen 20.

In this embodiment, the first supporting structure and the second supporting structure may be matching comb-shaped supporting rods, but the present application is not limited thereto.

In this embodiment, the driving structure includes at least one first rack 311 which is arranged close to a first side surface or/and a second side surface of the second housing 12 and at least one first gear 312 which is fixed to the first roller 40, and meshed with the first rack 311.

Please refer to FIG. 2, the driving structure may include two first racks 311 symmetrically disposed on the box body 122, one of the two first racks 311 is arranged at a first side of the box body 122, and the other is arranged at a second side of the box body 122. The first side of the box body 122 corresponds to a first side of the second housing 12, and the second side of the box body 122 corresponds to a second side of the second housing 12.

In this embodiment, the first rack 311 is attached to the box body 122 and is fixed to the box body 122, and the first rack 311 is arranged on one side of the box body 122 close to the flexible display screen 20.

In this embodiment, the driving structure may include two first gears 312 symmetrically disposed on the box body 122. One of the first gears 312 corresponds to one of the first racks 311.

Figure 4:
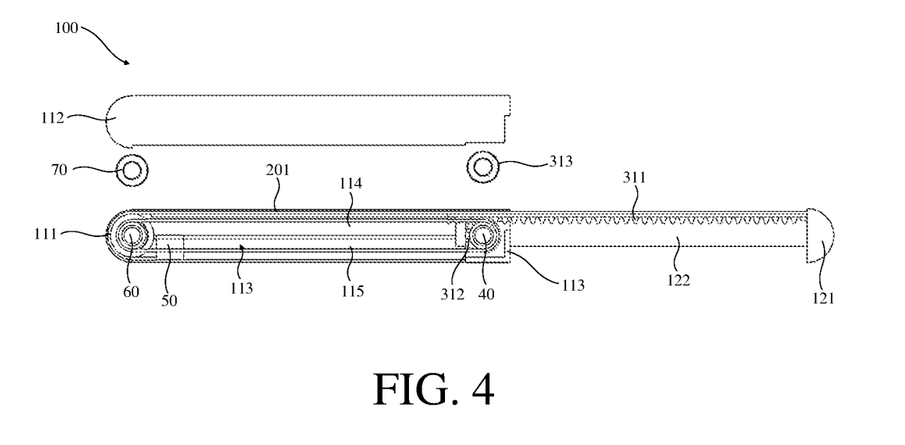
FIG. 4 is a cross-section view of the display device in the stretched state according to the present application.

Please refer to FIGS. 3-4, when the display device 100 displays with a large screen, the first rack 311 drives the driven structure to rotate in a first direction through the first gear 312, so that the second housing 12 moves in the direction away from the first housing 11.

Moreover, the number of the first rack 311 and the first gear 312 is not limited to two, and may be plural. For example, a plurality of the first racks 311 and the corresponding first gears 312 may be disposed with equal interval between a first side surface and the second side surface of the box body 122.

In this embodiment, the first direction is a clockwise direction in a front view of the display device.

In the display device 100 of the present application, the driving structure further includes at least two first bearing sets and at least two first bearing housings. The at least two first bearing sets include two first bearings 313, the first bearings 313 are arranged at two sides of the first gear 312, and the first bearings 313 are fixed to the first roller 40. The first bearing housings 314 correspond to the first bearing sets, and the first bearing housings 314 wrap the first bearing sets and the first gear 312.

Please refer to FIG. 2, the number of first bearings sets and the number of the first bearing housings 314 correspond to the number of the first gear 312. The first bearing housings 314 wrap and protect the first bearing sets and the first gear 312 to prevent unnecessary friction with the box body 122 or to prevent dust from entering.

In this embodiment, the first bearing housings 314 include a first baffle and a second baffle, and the first bearing housings 314 have only one opening facing the first housing 11 through the first baffle, the second baffle, and the box body 122.

In this embodiment, the first bearings 313 may be bell bearings, sliding bearings, etc., and the present application is not limited thereto. The first roller 40 is fixed to an inner bearing of the first bearing 313, an outer bearing of the first bearing 313 is fixed to the first side housing 112 and the second side housing 113 of the first housing 11, and the first roller 40 rotates with the inner bearing of the first bearing 313 within the outer bearing of the first bearing 313 by an external driving force.

In this embodiment, the first gear 312 includes a plurality of cogging between two adjacent teeth, the cogging may be recessed in the first roller 40. Since the rack and the corresponding gear are matched, the teeth of the rack and the teeth of the gear are matched, and the rack or/and the gear may be loose in the horizontal direction of the first roller 40. As a result, the friction between the gear and the rack increases, which intensifies the wear of the gear and the rack. The present application prevents rack or/and the gear from being loose in the horizontal direction and guarantees stability of the rack and gear through arranging the first gear 312 and the second gear in the cogging to match the teeth of the rack and the teeth of the gear and make the first roller 40 blocked horizontally.

The driven structure of the display device 100 of the present application includes at least two driven wheel sets and a connecting wheel 323.

Each of the driven wheel sets includes a first driven wheel 321 and a second driven wheel 322, the first driven wheel 321 is fixed to the first roller 40, and the first driven wheel 321 is arranged between the first gear 312 and the first bearing 313 which is away from a side of the first bearing housings 314.

The connecting wheel 323 is configured to connect the first driven wheel 321 and the second driven wheel 322, wherein the connecting wheel 323 enables the first driven wheel 321 and the second driven wheel 322 to rotate synchronously.

In this embodiment, the driven structure includes at least two driven wheel sets which are symmetrically disposed on the first side housing 112 and the second side housing 113. The driven wheel sets correspond to the first gear 312.

In this embodiment, a diameter of the first driven wheel 321 is equal to a diameter of the second driven wheel.

In this embodiment, the first driven wheel 321 and the second driven wheel 322 are belt pulleys, and the connecting wheel 323 is a belt; or the first driven wheel 321 and the second driven wheel 322 are chain wheels, and the connecting wheel 323 is a chain. The first driven wheel 321, the second driven wheel 322, and the connecting wheel 323 are not limited thereto.

Please refer to FIGS. 3-4, when the display device 100 displays with the large screen, the first rack 311 enables the first driven wheel 321 to rotate in a first direction through the first gear 312 and the first roller 40, the first driven wheel 321 drives the second driven wheel 322 to rotate along a first direction through the connecting wheel 323, so that the second housing 12 moves away from the first housing 11.

The display device 100 of the present application further includes a sliding block 50 and a second roller 60.

The sliding block 50 is fixed on the connecting wheel 323.

The second roller 60 is disposed on one side of the first housing 11 away from the driving structure, the second driven wheel 322 is fixed on the second roller 60, and the second part 22 of the flexible display screen 20 extends into the first housing 11 along the second roller 60 and is fixed to the sliding block 50.

Please refer to FIG. 2, a first end of the flexible display screen 20 is fixed to the front housing of the second housing 12, and a second end of the flexible display screen 20 is fixed to the sliding block 50. When the second housing 12 moves along the third direction, the sliding block 50 follows the connecting wheel 323 to move correspondingly.

In this embodiment, the flexible display screen 20 extends from the outside of the first housing 11 to the inside of the first housing 11 through the second roller 60. The flexible display screen 20 is turned 180° by the second roller 60 and extended toward the first roller 40 so that one end of the flexible display screen 20 is fixed to the sliding block 50.

Please refer to FIGS. 3-4, when the display device 100 displays with a large screen, the second housing 12 moves in the direction away from the first housing 11 by the external driving force, the first rack 311 enables the first roller 40 to rotate along the first direction through the first gear 312, and the first roller 40 is fixed to the first driven wheel 321, which makes the first gears rotate with the first roller 40 along the first direction. The second driven wheel 322 is connected to the first driven wheel 321 via the connecting wheel 323, and the second driven wheel 322 and the connecting wheel 323 rotate with the first roller 40 along the first direction. The sliding block 50 is fixed to the connecting wheel 323, the connecting wheel 323 drives the sliding block 50 to move away from the first gear 312 to make the flexible display screen 20 roll along the second roller 60 in the first direction, and the second part 22 of the flexible display screen 20 moves from the inner part of the first housing 11 to the surface of the first housing 11.

Figure 6:
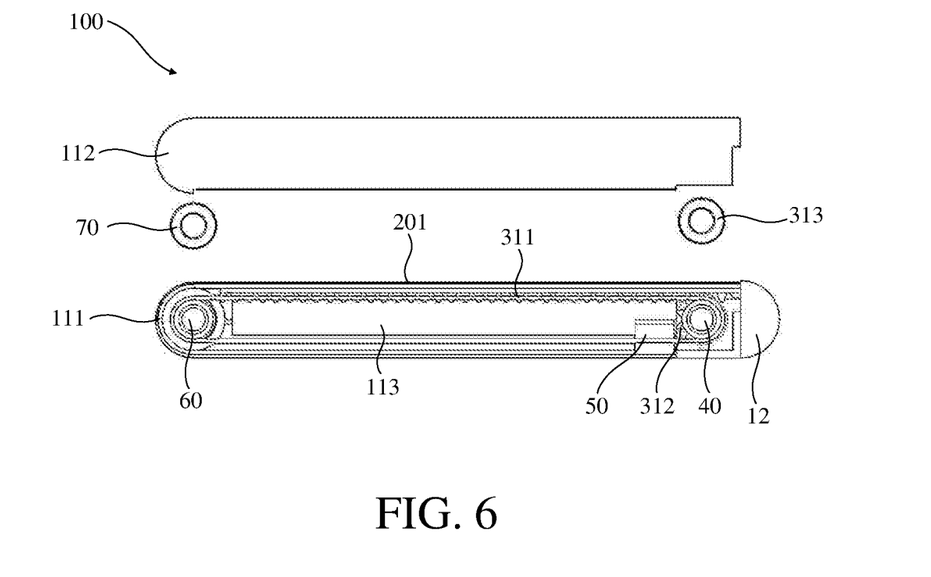
FIG. 6 is a cross-section view of the display device in the folded state according to the present application.

Please refer to FIGS. 5-6, when the display device 100 displays with a small screen, the second housing 12 moves in the direction towards the first housing 11 by the external driving force. The first rack 311 rotates the first roller 40 in the second direction through the first gear 312. The first driven wheel 321 rotates with the first roller 40 in the second direction. The second driven wheel 322 and the connecting wheel 323 rotate with the first driven wheel 321 in the second direction. The connecting wheel 323 drives the sliding block 50 to move towards the direction towards the first gear 312, and the flexible display screen 20 rolls along the second direction of the second roller 60, so that the second part 22 of the flexible display screen 20 moves from the surface of the first housing 11 to the inner part of the first housing 11 and extends toward the direction of the first gear 312.

Therefore, the technical solution of the present application is able to adjust the moving distance of the second housing 12 and the sliding distance of the sliding block 50 according to the size relationship between the first gear 312 and the first driven wheel 321.

In this embodiment, the second direction is a counterclockwise direction in a front view of the display device.

In this embodiment, a pitch circle diameter of the first gear 312 is equal to a diameter of the first driven wheel 321. Since the first gear 312 and the first driven wheel 321 are coaxially rotated through the first roller 40, the first gear 312 rotates the same angle as the first driven wheel 321. Since the pitch circle diameter of the first gear 312 is equal to the diameter of the first driven wheel 321, a rotation arc of the first gear 312 is equal to an arc of the first driven wheel 321. Since the connecting wheel 323 is fixed to the first driven wheel 321, the sliding block 50 moves by the same distance as the first gear 312 rotates. Finally, the moving distance of the second housing 12 in the direction away from or towards the first housing 11 is equal to the distance of movement of the first rack 311, and thus the moving distance of the second housing 12 in the third direction is equal to the moving distance of the sliding block 50.

Please refer to FIG. 2, the display device 100 further includes second bearings 70 arranged at two sides of the second roller 60, and the external driving force makes the second roller 60 rotate in the second bearing 70.

In this embodiment, the sliding block 50 may be non-fixedly connected to the pulley, and a tensile force may be applied to a side of the sliding block 50 away from the second roller 60 to make the sliding block 50 be tensioned, and make the diameter of the second driven wheel 322 be equal to the diameter of the second roller 60. The second driven wheel 322 is fixed to the second roller 60, that is, the diameter of the first driven wheel 321 is equal to the diameter of the second driven wheel 322.

In the embodiment, the connecting wheel 323 enables the first driven wheel 321 and the second driven wheel 322 to rotate synchronously, and the rotation arc length of the first driven wheel 321 is equal to the rotation arc length of the second driven wheel 322. The second driven wheel 322 rotates coaxially with the second roller 60, and the diameter of the second driven wheel 322 is equal to the diameter of the second roller 60. As a result, the rotation arc length of the second driven wheel 322 is equal to that of the rotation arc length of the second roller 60. In other words, the moving distance of the second driven wheel 322 is equal to the rotation arc length of the second roller 60. The moving distance of the second housing 12 is equal to the moving distance that the flexible display 20 moves from the inside of the first housing 11, which achieves the same technical effects as the above-mentioned embodiments.

In addition, when the display device 100 is folded, the tensile force applied to the sliding block 50 can pull the sliding block 50 back to an area close to the first roller 40.

In this embodiment, the first side housing 112 and the second side housing 113 include a first rail 114 close to the flexible display screen 20 and a second rail 115 away from the flexible display screen 20, the first rack 311 and the second rack move on the first rail 114, and the sliding block 50 moves on the second rail 115.

Figure 7:
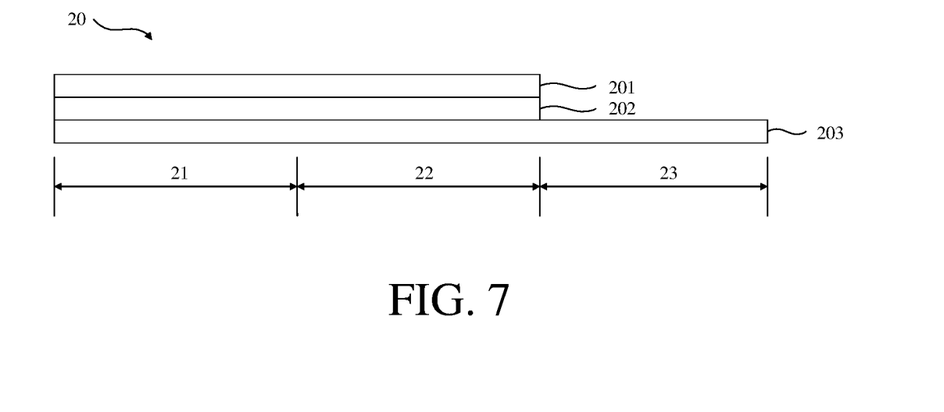
FIG. 7 is an expanded view of a flexible display screen in the display panel according to the present application.

Please refer to FIG. 7, the flexible display screen 20 includes a display panel 201, a stretching layer 203, and a bonding layer 202 positioned between the display panel 201 and the stretching layer 203. A first end of the stretching layer 203 is fixed to the second housing 12, and a second end of the stretching layer 203 is fixed to the sliding block 50.

In this embodiment, the flexible display screen 20 further includes a third part 23 fixed on the sliding block 50, the third part 23 of the flexible display screen 20 corresponds to the stretching layer 203, and the third part 23 of the flexible display screen 20 is a non-functional area.

In this embodiment, the display panel 201 may be a liquid crystal display (LCD) panel or an organic light-emitting diode (OLED) display panel. The display panel 201 may be rolled into any shape.

In this embodiment, an area of the display panel 201 is smaller than an area of the stretching layer 203.

In this embodiment, a material of the stretching layer 203 is a stretchy Steel Special Use Stainless (SUS) metal material or an amorphous material. When the material of the stretching layer 203 is the SUS metal material, a thickness of the stretching layer 203 may be 25 nm to 30 nm.

In the display device 100 of the present application, the housing unit 10 is further provided with a processor, a driving chip, and a power supply assembly, but the present application is not limited thereto.

The present application provides the display device which includes the housing unit and the flexible display screen. The first supporting structure is fixed to the housing unit, a second supporting structure is slidably arranged opposite to the first supporting unit, and a driving mechanism is disposed in the housing unit and connected to the second supporting structure. The flexible display screen is laid between a side of the first supporting structure and a side of the second supporting structure, and a first end of the flexible display screen is connected to an end of the second supporting structure. The end of the second supporting structure is away from the first supporting structure, and a second end of the flexible display screen is connected to the driving mechanism. The present application disposes the driving mechanism on the display device to make the first supporting structure and the second supporting structure slide relatively and maintain a same distance so that the display device will not receive excessive pulling force, damage to the flexible display screen can be prevented, and the lifespan of the display device will be longer. Furthermore, the flexible display screen of the display device can display with small screen or large screen without enlarging volume.

It is understood that those of ordinary skill in the art may be equally substituted or changed in accordance with the technical scheme of this application and its invention concept, all of which shall fall within the protection of the claims attached to this application.

What is claimed is:

1. A display device, comprising:
   a housing unit;
   a first supporting structure;
   a second supporting structure;
   a driving mechanism disposed in the housing unit and connected to the second supporting structure; and
   a flexible display screen, laid between a side of the first supporting structure and a side of the second supporting structure, wherein a first end of the flexible display screen is connected to an end of the second supporting structure away from the first supporting structure, and a second end of the flexible display screen is connected to the driving mechanism;
   wherein when the first supporting structure and the second supporting structure slide relatively, the first end and the second end of the flexible display screen move under an action of the driving mechanism to maintain a same distance,
   wherein the housing unit comprises a first housing and a second housing which are oppositely arranged, the first housing is fixed to the first supporting structure, and the second housing is fixed to the second supporting structure;
   the flexible display screen comprises a first part on a surface of the housing unit and a second part in the housing unit;
   the driving mechanism comprises a driving structure disposed on the second housing and a driven structure disposed on the first housing, and the driving structure is fixed to the driven structure through a first roller;
   when the display device displays with a small screen, the first part of the flexible display screen is in a display state, and the second part of the flexible display screen is in a non-display state; and
   when the display device displays with a large screen, the driving structure on the second housing drives the driven structure to rotate, so that the second housing moves in a direction away from the first housing, the second part of the flexible display screen moves from the housing unit to the surface of the housing unit, and the first part and the second part of the flexible display screen are in the display state;

wherein the driving structure comprises:

at least one first rack, arranged close to a first side surface or/and a second side surface of the second housing;

at least one first gear, fixed to the first roller, and meshed with the first rack;

at least two first bearing sets, wherein each of the first bearing sets comprises two first bearings, the first bearings are arranged at two sides of the first gear, and the first bearings are fixed to the first roller; and at least two first bearing housings, wherein the first bearing housings correspond to the first bearing sets, and the first bearing housings wrap the first bearing sets and the first gear;

when the display device displays with the large screen, the first rack drives the driven structure to rotate in a first direction through the first gear, so that the second housing moves in the direction away from the first housing;

wherein the driven structure comprises:

at least two driven wheel sets, wherein each of the driven wheel sets comprises a first driven wheel and a second driven wheel, the first driven wheel is fixed to the first roller, and the first driven wheel is arranged between the first gear and the first bearing which is away from a side of the first bearings set; and a connecting wheel which is configured to connect the first driven wheel and the second driven wheel, wherein the connecting wheel enables the first driven wheel and the second driven wheel to rotate synchronously;

when the display device displays with the large screen, the first rack enables the first driven wheel to rotate in the first direction through the first gear and the first roller, and the first driven wheel drives the second driven wheel to rotate along the first direction through the connecting wheel, so that the second housing moves away from the first housing.

2. The display device as claimed in claim 1, wherein a pitch circle diameter of the first gear is equal to a diameter of the first driven wheel.

3. The display device as claimed in claim 1, wherein the first driven wheel and the second driven wheel are belt pulleys, and the connecting wheel is a belt; or the first driven wheel and the second driven wheel are chain wheels, and the connecting wheel is a chain.

4. The display device as claimed in claim 3, wherein the flexible display screen comprises a display panel, a stretching layer, and a bonding layer positioned between the display panel and the stretching layer;

a first end of the stretching layer is fixed to the second housing, and a second end of the stretching layer is fixed to a sliding block.

5. The display device as claimed in claim 4, wherein an area of the display panel is smaller than an area of the stretching layer.

6. The display device as claimed in claim 5, wherein the flexible display screen further comprises a third part fixed on the sliding block, the third part of the flexible display screen corresponds to the stretching layer, and the third part of the flexible display screen is a non-functional area of the display device.

7. The display device as claimed in claim 4, wherein a material of the stretching layer is a stretchy Steel Special Use Stainless (SUS) metal material or an amorphous material.

8. The display device as claimed in claim 4, wherein the bonding layer is an adhesive layer such as an optically clear adhesive.

9. The display device as claimed in claim 1, wherein the display device further comprises:

a sliding block which is fixed on the connecting wheel; and a second roller, disposed on one side of the first housing away from the driving structure, wherein the second driven wheel is fixed on the second roller, and the second part of the flexible display screen extends into the first housing along the second roller and is fixed to the sliding block;

when the display device displays with the large screen, the second housing moves in the direction away from the first housing by an external driving force, the connecting wheel drives the sliding block to move towards a direction away from the first gear, and the flexible display screen rolls along a first direction of the second roller, so that the second part of the flexible display screen moves from an inner part of the first housing to a surface of the first housing; and when the display device displays with the small screen, the second housing moves in a direction towards the first housing by the external driving force, the connecting wheel drives the sliding block to move in the direction towards the first gear, and the flexible display screen rolls along a second direction of the second roller, so that the second part of the flexible display screen moves from the surface of the first housing to the inner part of the first housing and extends toward the direction of the first gear.

10. The display device as claimed in claim 9, wherein the display device further comprises second bearings arranged at two sides of the second roller, and the external driving force makes the second roller rotate in the second bearings.

11. The display device as claimed in claim 9, wherein the first housing comprises a rear housing, a first side housing, and a second side housing, wherein the first side housing and the second side housing are positioned on two sides of the rear housing, the first side housing corresponds to a first side of the second housing, and the second side housing corresponds to a second side of the second housing;

wherein the first side housing and the second side housing comprise a first rail close to the flexible display screen and a second rail away from the flexible display screen, the first rack and the second rack move on the first rail, and the sliding block moves on the second rail.

12. The display device as claimed in claim 9, wherein the first supporting structure comprises a first supporting plate fixed to a rear housing of the first housing, and the second supporting structure comprises a box body fixed to a front housing of the second housing;

when the display device displays with the small screen, the first supporting plate is contained in the box body; and when the display device displays with the large screen, the first supporting plate moves from the box body to the direction away from the front housing.

13. The display device as claimed in claim 12, wherein the first supporting structure and the second supporting structure are matching comb-shaped supporting rods.

14. The display device as claimed in claim 1, wherein the housing unit is further provided with a processor, a driving chip, and a power supply assembly.

* * * * *